US008938671B2

(12) United States Patent
Eisen et al.

(10) Patent No.: US 8,938,671 B2
(45) Date of Patent: Jan. 20, 2015

(54) METHODS AND APPARATUS FOR SECURELY DISPLAYING DIGITAL IMAGES

(75) Inventors: Ori Eisen, Scottsdale, AZ (US); Raz Yalov, Scottsdale, AZ (US)

(73) Assignee: The 41st Parameter, Inc., Scottsdale, AZ (US)

(*) Notice: Subject to any disclaimer, the term of this patent is extended or adjusted under 35 U.S.C. 154(b) by 1245 days.

(21) Appl. No.: 11/769,674

(22) Filed: Jun. 27, 2007

(65) Prior Publication Data

US 2008/0002911 A1    Jan. 3, 2008

Related U.S. Application Data

(63) Continuation-in-part of application No. 11/612,425, filed on Dec. 18, 2006, now Pat. No. 8,612,854.

(60) Provisional application No. 60/751,188, filed on Dec. 16, 2005.

(51) Int. Cl.
| G06K 9/34 | (2006.01) |
| H04N 1/44 | (2006.01) |
| G06F 21/62 | (2013.01) |
| G06F 21/84 | (2013.01) |
| H04N 1/00 | (2006.01) |

(52) U.S. Cl.
CPC .......... *H04N 1/4486* (2013.01); *G06F 21/6245* (2013.01); *G06F 21/84* (2013.01); *H04N 1/00864* (2013.01); *H04N 1/00872* (2013.01)
USPC ............................ 715/271; 715/255; 715/272

(58) Field of Classification Search
CPC .. G06F 17/211; G06F 17/2264; G06F 17/243
USPC ......... 715/200, 221, 222, 223, 229, 243, 246, 715/247, 253, 255, 272, 271
See application file for complete search history.

(56) References Cited

U.S. PATENT DOCUMENTS

| 4,912,761 A | 3/1990 | Tan et al. |
| 5,184,849 A | 2/1993 | Taylor |
| 5,491,735 A * | 2/1996 | Hsieh .............................. 378/15 |

(Continued)

FOREIGN PATENT DOCUMENTS

WO    WO 2007/045818 A1    4/2007

OTHER PUBLICATIONS

Banking Services Newsletter: Keeping You Up-to-Date on Banking Developments Throughout the UC System. UCOP-Banking Services Group. Dec. 2005. (8 pages).

(Continued)

*Primary Examiner* — Stephen Hong
*Assistant Examiner* — Gregory J Vaughn
(74) *Attorney, Agent, or Firm* — Wilson Sonsini Goodrich & Rosati

(57) ABSTRACT

The invention provides methods and apparatus for securing personalized or sensitive information appearing in digital images. Digital images containing information to be secured is processed and divided into a plurality of image cells. At least one image cell from the plurality of image cells is selected and redacted or altered to render the information to be secured with the selected image cells indecipherable. The invention also provides methods and apparatus for transmitting or streaming unredacted image cells alone or in combination with redacted image cells for secured viewing on a user browser or computer.

7 Claims, 11 Drawing Sheets

(56) References Cited

U.S. PATENT DOCUMENTS

| | | | |
|---|---|---|---|
| 5,748,780 | A | 5/1998 | Stolfo |
| 5,886,334 | A | 3/1999 | D'Entremont et al. |
| 6,078,907 | A * | 6/2000 | Lamm ............................ 705/40 |
| 6,327,384 | B1 * | 12/2001 | Hirao et al. ................... 382/173 |
| 6,567,099 | B1 | 5/2003 | Dawson |
| 6,646,765 | B1 * | 11/2003 | Barker et al. ................. 358/474 |
| 6,803,920 | B2 | 10/2004 | Gossett et al. |
| 6,954,532 | B1 | 10/2005 | Handley et al. |
| 7,002,712 | B2 * | 2/2006 | Barker et al. ................. 358/474 |
| 7,039,505 | B1 | 5/2006 | Southard et al. |
| 7,130,858 | B2 * | 10/2006 | Ciaramitaro et al. ................. 1/1 |
| 7,272,610 | B2 | 9/2007 | Torres |
| 7,292,723 | B2 * | 11/2007 | Tedesco et al. .............. 382/159 |
| 7,363,170 | B2 * | 4/2008 | Seul et al. ....................... 702/19 |
| 7,401,082 | B2 * | 7/2008 | Keene et al. .................. 707/785 |
| 7,475,242 | B2 * | 1/2009 | Baird et al. ................... 713/166 |
| 2001/0046096 | A1 | 11/2001 | Worden |
| 2002/0041328 | A1 | 4/2002 | LeCompte et al. |
| 2002/0083079 | A1 | 6/2002 | Meier et al. |
| 2003/0002732 | A1 | 1/2003 | Gossett et al. |
| 2003/0002740 | A1 | 1/2003 | Melikian et al. |
| 2003/0033161 | A1 | 2/2003 | Walker et al. |
| 2003/0115481 | A1 * | 6/2003 | Baird et al. ................... 713/201 |
| 2004/0004733 | A1 * | 1/2004 | Barker et al. ................. 358/1.13 |
| 2004/0088313 | A1 | 5/2004 | Torres |
| 2004/0260876 | A1 | 12/2004 | Singh et al. |
| 2005/0039034 | A1 | 2/2005 | Doyle et al. |
| 2005/0039219 | A1 * | 2/2005 | Cooper et al. ................ 725/134 |
| 2005/0111054 | A1 | 5/2005 | Umeda |
| 2005/0185225 | A1 * | 8/2005 | Brawn et al. .................. 358/401 |
| 2005/0246551 | A1 | 11/2005 | Dondl et al. |
| 2006/0008779 | A1 | 1/2006 | Shand et al. |
| 2006/0126829 | A1 | 6/2006 | Lai |
| 2006/0161501 | A1 | 7/2006 | Waserstein et al. |
| 2007/0094594 | A1 | 4/2007 | Matichuk et al. |
| 2007/0183000 | A1 | 8/2007 | Eisen et al. |
| 2008/0204788 | A1 | 8/2008 | Kelly et al. |

OTHER PUBLICATIONS

Bharosa Press Release. Bharosa announces online authentication solution to counter check 21-based fraud. Nov. 7, 2005. Available at http://www.bharosa.com/news/PR-110705.html. Accessed Jan. 18, 2007. (2 pages).

Bharosa Products: Bharosa Virtual Authentication Devices—CheckPad: Secure check viewing online. Available at http://bharosa.com/authenticator.html. Accessed Jan. 18, 2007. (3 pages).

Darlin, Damon. Opening the door on credit reports and pitching the lock. The New York Times. Mar. 18, 2006. (2 pages).

Techweb News: Wells Fargo Intros Anti-Theft Alerts. Available at http://techweb.com/wire/166404177. Accessed Mar. 20, 2006. (1 page).

UPIC Marketing Guide—The Clearing House. Available at http://www.upic.com/infofiles/UPIC_Marketing_Guide.pdf. Accessed Dec. 19, 2006. (17 pages).

European search report dated Oct. 27, 2008 for Application No. 08159110.9.

European search report dated Mar. 13, 2009 for Application No. 06845722.5.

International search report dated Feb. 26, 2008 for PCT/US2006/48251.

Office action dated Feb. 28, 2012 for U.S. Appl. No. 11/612,425.
Office action dated Jun. 21, 2011 for U.S. Appl. No. 11/612,425.
Office action dated Jun. 23, 2010 for U.S. Appl. No. 11/612,425.
Office action dated Oct. 6, 2010 for U.S. Appl. No. 11/612,425.
Office action dated Oct. 24, 2012 for U.S. Appl. No. 11/612,425.
Office action dated Dec. 29, 2009 for U.S. Appl. No. 11/612,425.
Office action dated Jun. 20, 2013 for U.S. Appl. No. 11/612,425.

* cited by examiner

Jane Doe
101 Anydrive
Hometown, IN 46278

5600

FRN (Fractional Routing Number)

→ 12-345/678  -OR-  12-3456/789

PAY TO THE
ORDER OF

DATE $

DOLLARS

SIGNATURE 123456789 123456789101112 5600

METHODS AND APPARATUS FOR SECURELY DISPLAYING DIGITAL IMAGES

This application is a continuation-in-part application of U.S. patent application Ser. No. 11/612,425 filed on Dec. 18, 2006, now U.S. Pat. No. 8,612,854 which claims the benefit of priority to U.S. Provisional Patent Application Ser. No. 60/751,188 filed on Dec. 16, 2005, wherein each are incorporated herein by reference in their entirety.

FIELD OF THE INVENTION

The invention relates to securely displaying digital images of documents containing selected or confidential information. More particularly, the invention relates to methods and apparatus for altering or redacting digital images of documents for viewing such as personal checks in order to secure sensitive information.

BACKGROUND

Converting a paper hardcopy document into a digital image may be desirable due to the ease with which it can be transmitted and processed by a computer system. For example, images of documents can be scanned and transmitted via e-mail or shared on the Internet using a variety of known protocols such as HTTP or FTP. Obtaining a digital image of a document may also be advantageous so that it can be manipulated or edited on a computer system. Electronic transmissions of digital images are frequently preferred over traditional postal methods due to speed of delivery and the ever increasing number of computer systems and our reliance thereon.

The U.S. Congress recognized the advantages of using digital versions of checks over paper versions thereof by passing the Check 21 Act enacted in 2003. The Check 21 Act allows a financial institution to create a digital version of a processed check and make it accessible online to the payer of the check, thereby eliminating the need for further handling or return of the paper check. This computerized process greatly reduces the time and costs associated with the processing of paper checks, and hence enhances the efficiency of our banking system. It also provides an easy and convenient alternative for bank customers to monitor and manage banking related documents and activities. Online checking offered by many financial institutions such as Bank of America and Wells Fargo allows customers to conveniently view digital images of their cashed checks.

However digital images of documents may often contain personal or sensitive information that a customer or a user may wish to conceal. The term "sensitive information" may include anything designated by a party that should be secured for viewing online such as a customer's name, address or telephone number in conjunction with the customer's social security number, driver's license, or account number (FDIC FIL-27 2005).

At the same time, images must also reveal or contain sufficient information that is legible or usable to the user. For example, banks and other kinds of financial institutions allow a user to access an online bank account and view a digital image of a processed check or financial document. But sensitive information such as the customer's name, bank account number, routing number, address, telephone number, signature and other personal information, may appear on a computer screen while viewing a digital version of the check. The security of such personalized or sensitive information is compromised when it is displayed. The customer or user may therefore wish to hide or secure such personalized information from computer hackers, identity thieves, or even from viewers with no ill intentions.

A variety of graphics editing programs are available today such as Adobe Photoshop that allows a digital image to be edited or altered manually. Original versions of an image may be created and saved as a new image. When using such software programs, a user often manually edits the personalized or sensitive content of the individual digital image with an editing tool such as a blur tool included with the software. Meanwhile, banks and other financial institutions usually process large quantities of checks and/or documents containing personalized or sensitive information. A financial institution may have numerous customers, each with an online bank account on which they can view digital versions of a processed or cashed check. The digital image may be conveniently displayed to a customer while at the same time the financial institution can avoid having to mail or return the processed check to the customer. The ability to efficiently process a large number of checks while protecting personal information contained therein presents significant challenges in online security and the prevention of fraud or theft.

A need therefore exists to secure and protect personalized or sensitive information within digital images of documents. It would be further advantageous to protect available information online without having to manually and singularly edit or alter the contents of the digital images.

SUMMARY OF THE INVENTION

The invention provides methods and apparatus for securing selected information contained within digital images of documents. Various aspects of the invention described herein may be applied to any of the particular applications set forth below or for any other types of information that is displayed for viewing. The invention may be applied as a standalone tool or as part of an integrated software solution against online fraud and identify theft. The invention can be optionally integrated into existing business processes seamlessly. It shall be understood that different aspects of the invention can be appreciated individually, collectively or in combination with each other.

A preferable embodiment of the invention provides image masking systems and methods for providing online banking customers with necessary or shared information online without exposing sensitive data to potential fraud. Such image masking can be performed real-time or on-the-fly to a presented image only without necessarily altering an originally scanned document. An originally scanned image can be remain intact and unaltered, in a preferable embodiment, while a new revised or redacted digital image can be created. All of the image information for redacted digital images provided herein may be transmitted for viewing, or alternatively, sanitized versions of a scanned document with just some of the image information may be sent instead to display non-sensitive portions of an original document. The modified or redacted digital images provided in accordance with the invention offer customers access to pictorial or graphical images of corresponding paper documents without compromising account or personal identity information that should be kept secured. Such information can be blurred by various digital editing techniques such as blurring or pixelating or shading, or alternatively, sections of the digital image containing sensitive information may not be transmitted at all.

Accordingly, the invention can provide numerous advantages over other available and complicated document security solutions by protecting sensitive customer data from fraud and identify theft without involving customer education, adoption or enrollment. No enrollment process or change of behavior is required on the part of customers. The security processes provided in accordance with the invention can be performed on the back end, invisible to users which can thereby enhance their sense of security without adding inconvenience or latency to the online experience (automated back-end security). While the masked images of secured documents herein may be helpful for daily use, customers can still request to view and access an unredacted version of a document when appropriate security measures are in place for additional authentication. Further password information may be requested, challenge questions may be presented calling for valid responses, one-time tokens or other strong authentication protocols may be employed.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized:

FIGS. 5-8 describe another embodiment of the invention that converts a first digital image of a document such as a check into a second redacted digital image containing selectively pixelated image cells that can be securely displayed.

DETAILED DESCRIPTION OF THE INVENTION

The invention is directed to methods and apparatus for modifying or altering digital images of documents in order to secure selected information contained therein. The selected information may include personalized or sensitive information or any content which can be redacted or hidden from view in accordance with the invention. The selected information may be hidden in an altered digital image so it can be secured from view. Another aspect of the invention provides high throughput automated processes and apparatus for securing or altering of digital images of hardcopies of documents. The invention further provides computer systems and software programs that include instructions to carry out or perform various steps of such methods.

Figure 1:
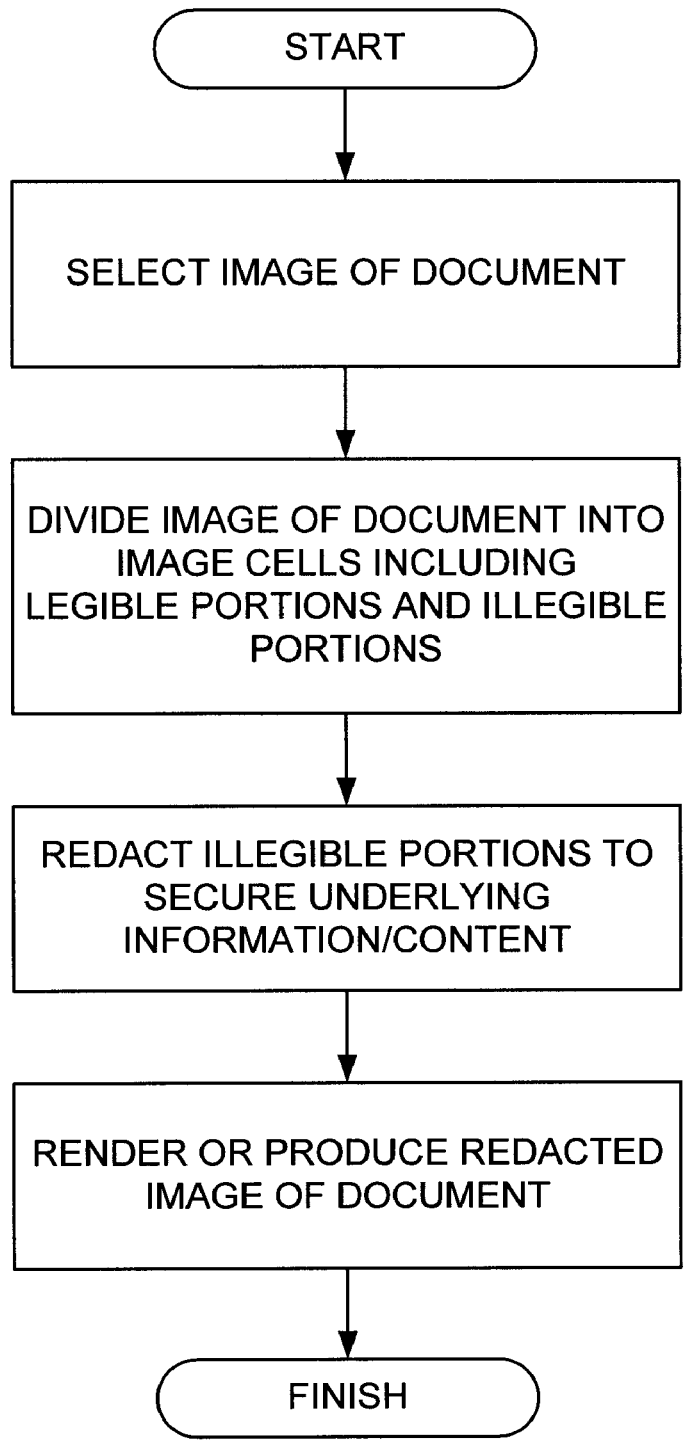
FIG. 1 describes methods of securing personalized or sensitive information displayed within a digital image of a document.

FIG. 1 describes an aspect of the invention that provides methods for securing selected information contained within a digital image. The digital image to be displayed may be derived from a scanned paper hardcopy document or any computer generated illustration that contains personalized or sensitive information or content. Upon selection of the digital image, it can be divided into a plurality of image cells that can be characterized or designated as either legible portions or illegible portions of the document or image. The legible portions of the image may present non-sensitive or non-personal information that a user may wish to display. The illegible portions of the image may however include sensitive, financial or personal information that should not be displayed. The image cells corresponding to illegible portions of the image may be redacted to hide or obscure the underlying information contained in the image. Meanwhile, the image cells corresponding to legible portions of the image can remain unredacted and visible so as to reveal content or images located therein. The resulting redacted or altered digital image can be useful in many respects and communicate sufficient context or information but not so far as to compromise or unnecessarily reveal sensitive information. Accordingly, the redacted image of the document can be rendered or available for display online in a controlled and secure manner.

A preferable embodiment of the invention provides a method of securely displaying digital images of banking related documents. The method comprises selecting a first digital image of a banking related document containing personalized content, dividing the first digital image into a plurality of image cells, and then redacting at least one of the image cells to provide a second digital image wherein the personalized content in the banking related document is illegible (see FIGS. 2-4). This methodology can be applied to a variety of digital images corresponding to checks (personal or business check images) from financial institutions or any hardcopy document outside of banking transactions. Other preferable embodiments of the invention can be directed to documents or digital images thereof such as deposit slips, bank statements, brokerage statements, legal documents, credit card bills, as well as tax documents or returns, driver's licenses, medical records or any other document containing personalized or sensitive information that a user may wish to hide or conceal from view on a computer or online. It shall be understood that the personalized or sensitive information need not be in the form of text, but may be rather a graphical image such as an illustration of an individual, fingerprint or biometric information. The documents secured in accordance with this aspect of the invention can originally exist as a paper hardcopy that can be scanned to create digital images, or the documents may be stored as digital images in computer readable memory such as a computer hard drives, flash memory drives or other memory media.

Figure 2:
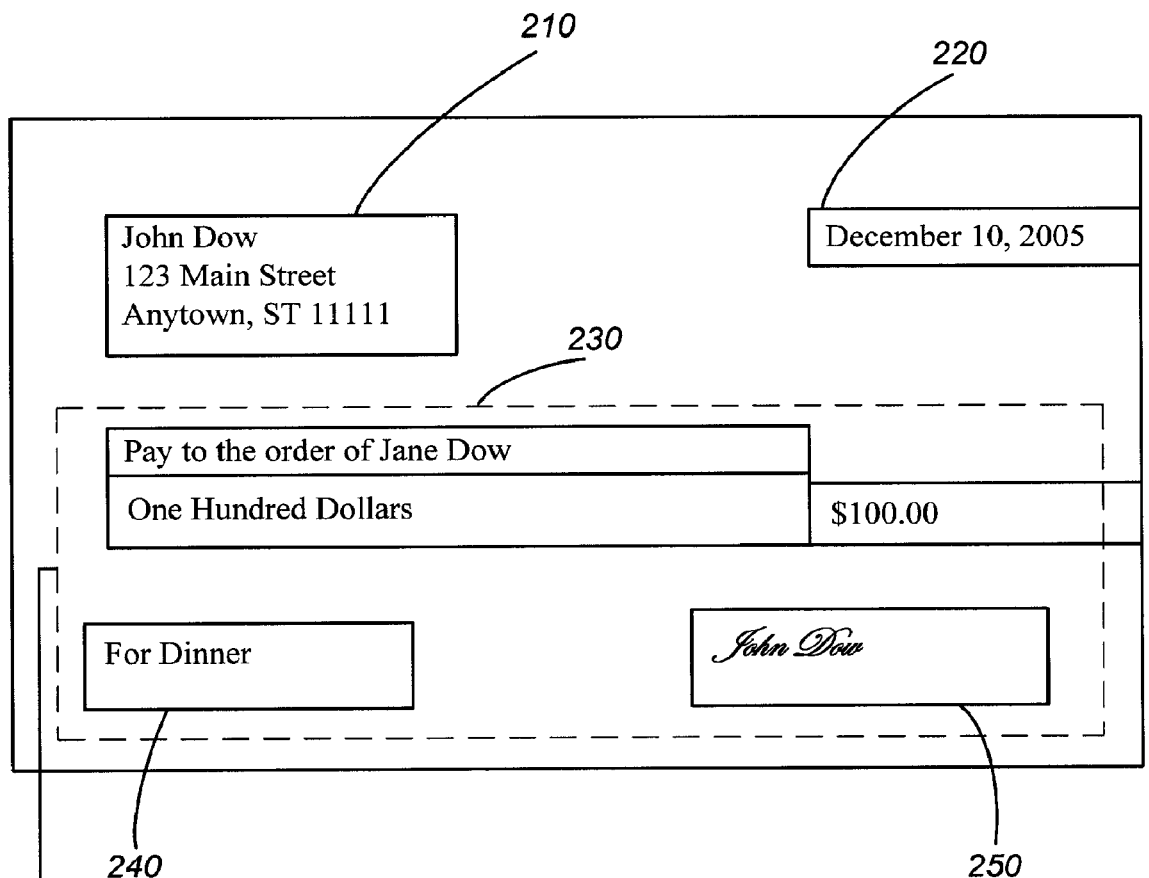
FIGS. 2-4 describe an embodiment of the invention that displays digital images of checks or other selected documents containing information to be secured.

A digital image of a check or a selected document can be chosen for secure display in accordance with the invention as shown in FIG. 2. The check or selected document can be designed with various shapes and sizes including relevant information printed thereon. Selected kinds of personalized information may be displayed or appear within the same general location or region on the face of the check or document. For example, the name and address information of an individual, e.g., payor, can be printed generally on the upper left hand corner 210 of the check or selected document. The date appears often in the upper right had corner 220. The central portion 230 of the check or selected document may contain other kinds of sensitive information. For example, with respect to any selected document, this location may include information such as credit card numbers, bank account/routing numbers, account statements from financial institutions or graphical content. It shall be understood that the invention can be applied to protecting other kinds of non-textual information such as photographs, images, blueprints or schematics that should not be readily viewable by an observer. With respect to a check, as shown in FIG. 2, the central portion 230 often includes the name of the payee or to whom the check is written. The dollar amount for the check appears immediately below usually written or spelled out (one hundred dollars) as well as appearing numerically ($100). A memo line is also provided o the lower left hand corner 240 of the check that identifies for what the check was written. A space or line 250 can be provided at the lower right hand corner of the check where the signature of the payor appears.

Figure 3:
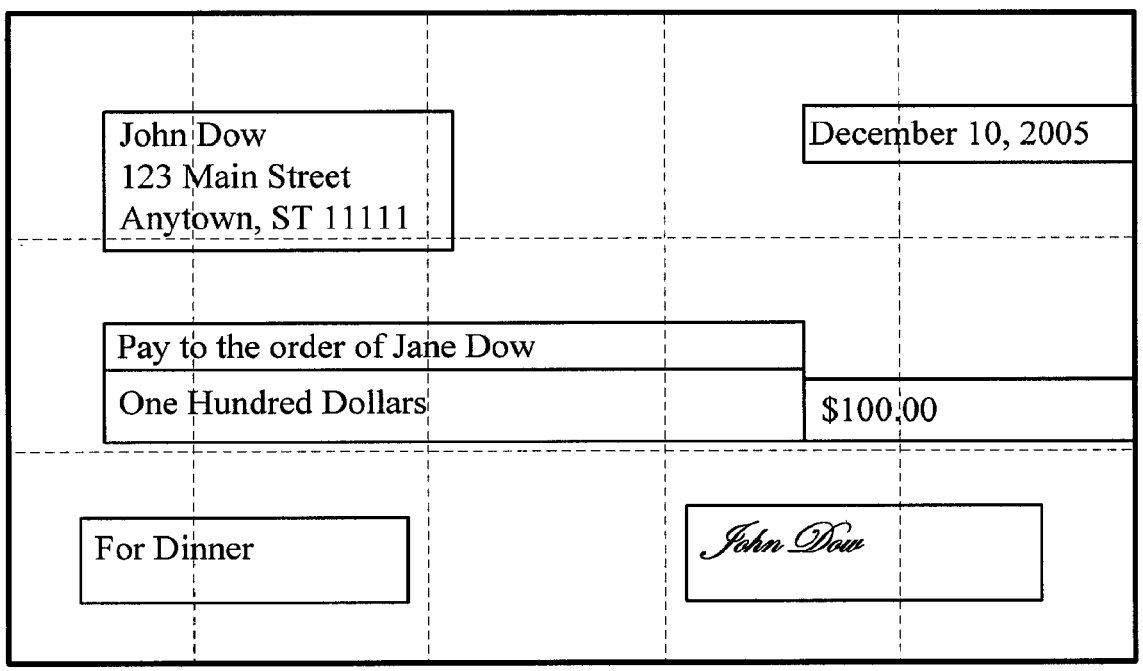

As shown in FIG. 3, the check can be conceptually divided into a plurality of image cells in accordance with the invention. The digital image of the check can be divided into a grid consisting of five (5) columns×three (3) rows. As with other embodiments of the invention described elsewhere herein, the image cells within the grid may be designated or separated into either redacted or un-redacted portions or cells. In some embodiments of the invention, the number of image cells within the grid may be predetermined or fixed by the party who wants to secure confidential information such as a payor or a bank having the account from which the check will be drawn against. When more image cells are selected, greater control can be provided over which regions of a check or a selected document can be secured in accordance with the invention. It shall be understood that the grids described herein may include any number of desired columns/rows and are not limited to rectangular or square shapes and can include image cells with different symmetrical or asymmetrical shapes and sizes.

Alternatively, the number and/or kind of image cells can be user defined. A user may select various image cell inputs designating the size, shape, and number of rows and columns for a desired grid. For example, a digital image can be divided into a plurality of image cells located within a rectangular grid based on user input values with a predefined number of rows and columns, e.g., 4 columns×3 rows. The grid may be characterized as a conceptual overlay upon the image so that the image can be broken-up or segmented into image cells that pertain to both redacted and un-redacted portions of the digital image. It shall be understood that image cells are not necessarily laid out in a grid like pattern with both rows and columns and can be alternatively arranged in any manner including a layout with cells that are aligned in only horizontal rows or only vertical columns.

Figure 4:
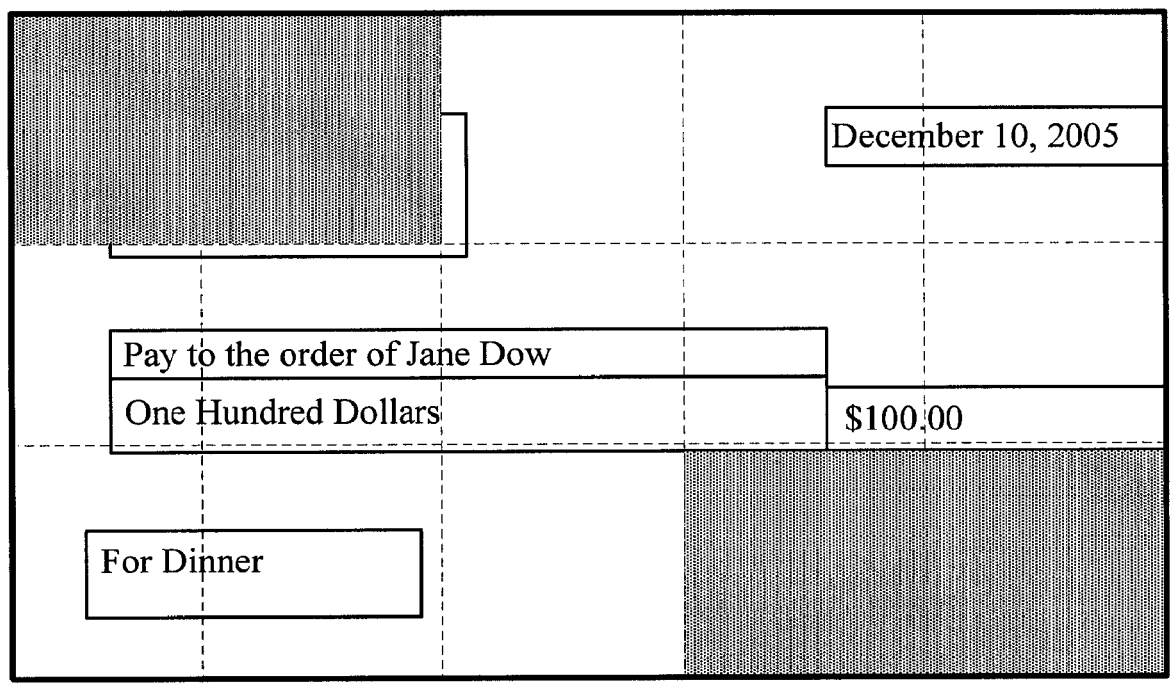

By selectively altering redacted portions of the digital image as shown in FIG. 4, sensitive information contained within the check or selected document can be protected. For example, one or more selected image cells containing sensitive information can be identified within the grid. These image cells can be designated as the ones for editing or redaction. The image fragments contained within these selected image cells or redacted cells can be altered in appearance in accordance with the invention. Meanwhile, the remaining or non-selected image cells can be left untouched so that corresponding image fragments contained therein are plainly visible. Any graphics editing software tool or program may be used to alter or change the appearance of the image fragments within the selected image cells so that the sensitive information contained within the selected image cells will not be legible to an ordinary observer. In a preferable embodiment, the selected image cells can be grayed out (colored grey) entirely as shown so that any traces of the image fragments are not visible. Two selected image cells located at the upper left hand corner of the digital image, and two selected image cells located at the lower right hand corner, can be redacted to protect sensitive information otherwise visible, namely the name and address of the payor and a corresponding signature. In another preferable embodiment of the invention, a group of one or more selected image cells may be deleted or omitted from a digital image before delivering or transmitting it for secure viewing. The entire redacted digital image(s) to be viewed may thus comprise the entire group or all image cells (redacted and un-redacted) or only a selected subgroup of image cells (un-redacted) corresponding to the document(s). Accordingly, the resulting digital image of the check or selected document can be displayed online or on a computer screen securely without sharing or disclosing sensitive information.

There are a variety of ways in which digital images can be redacted in accordance with the invention. For example, the step of redacting selected portions of a digital image can be achieved by a combination of one or more different means including graying or blacking out these areas. For purposes of this invention, the term "redacted" can mean a blurred, obscured, removed, blocked out, or crossed out so that underlying information cannot be seen and is not apparent on its face to an ordinary observer. Preferably, personalized information protected in accordance with the invention includes confidential subject matter such as personal data, financial or other types of information that can or should be shielded from general public viewing. Other ways to redact digital images in accordance with the invention may include various combinations of one or more techniques such as masking in solid colors (e.g., black, grey, white), pixelating or pixelizing, encrypting and/or otherwise rendering selected regions of a digital image illegible or indecipherable. In preferable embodiments of the invention, some legible portions of the digital image remain unredacted or plainly visible to reveal image fragments or contents of the document residing within these portions. It is often useful to provide at least some context and to relay some minimal amount of information to an observer but not to the extent such that sensitive information is revealed beyond an intended purpose.

FIG. 5 illustrates another embodiment of the invention that securely displays a digital image of a personal check containing a variety of sensitive information including a series of important numbers relating to a banking account. For example, a 9-digit number American Banking Association (ABA) routing transit number can be found at the bottom of the check adjacent to an account number from a financial institution. The ABA number or routing transit number is a sensitive piece of information that is often necessary to reorder checks, to set up direct deposits and recurring payments, or when preparing a wire transfer. The customer bank account number is another piece of sensitive information that should be guarded carefully to prevent identity theft and fraud. For many online banking purposes, it is not necessary to display these series of numbers. For example, a bank customer may just want to determine whether a check has been properly endorsed, or by whom, by viewing an image of the back of a check. The customer may also want to inspect the front face of the check to confirm there has been no forgery or unauthorized alterations made. The unsecured display of such information online thus presents exposure to both the customer and the financial institution with no intended benefit in such circumstances. Accordingly, any digital images of checks that are available online can be secured in accordance with the invention to prevent unauthorized viewing by hackers or other persons who gain access to viewable online account information.

As shown in FIG. 5, the check includes additional personalized or sensitive information such as the payor name and address, a signature line, and routing transit/bank account numbers. Upon writing and cashing the check, a digital image of the instrument can be created using available scanning equipment and processes by a financial institution. It can be redacted and secured in accordance with the invention as described elsewhere herein. However a financial institution such as a bank may determine a methodology or process beforehand in which the check and other similar checks can be secured for online display. For example, the check can be initially scanned and saved. Digital images can be saved and loaded into memory of any type of computer system or network maintained by the financial institution. The digital image may be saved as a file that can be edited in accordance with the invention, or in other embodiments, the image may be derived from a stream of data as with other embodiments described herein. It shall be understood again that invention can be applied to electronic or digital images of any type of document where it may be desirable to alter the content of the image such that at least a portion of the image cannot be seen or is illegible. Electronic images of other documents may be selected besides personal checks such as deposit slips, bank statements, credit card bills, tax returns, or any other documents that may contain sensitive or personal information. In addition, the digital image of a hardcopy of a document may exist in various known formats including without limitation the following commonly used graphics file formats for displaying digital images on the World Wide Web: JPEG/JPG, GIF, PNG, TIF, TIFF, BMP, PSD, WMF, EMF, PCX, PIC and PDF.

Figure 6:
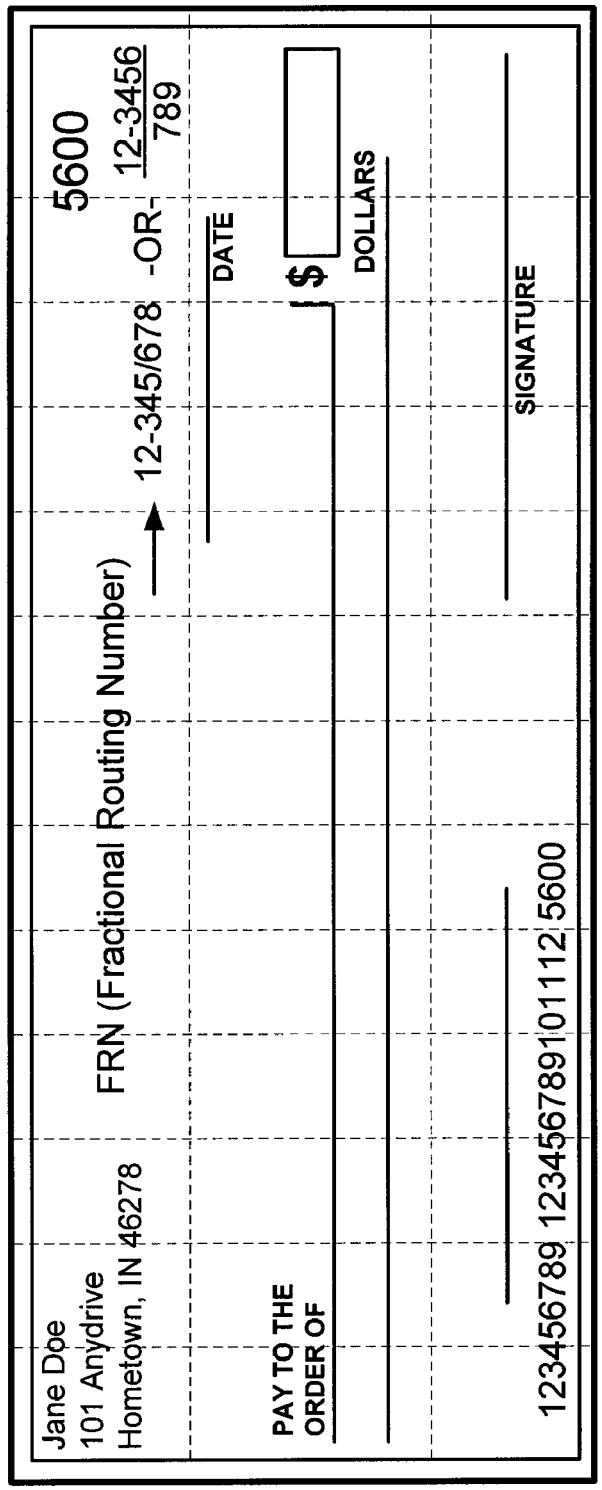

In a preferable embodiment of the invention, as shown in FIG. 6, the financial institution can divide the digital image of the check into a plurality of image cells. A grid can be formed over the check or its image to provide a series of image cells arranged in rows and columns. While any number of image cells may be chosen and arranged in different ways, the check as shown is divided into thirty-nine (39) sections. The grid can be thus designed with three (3) rows and thirteen (13) columns. When more image cells are defined in accordance with this aspect of the invention, more flexibility is often provided in redacting selected portions of the check. The number of selected image cells or the number of rows or columns into which the digital image is divided may be based on user input. In this embodiment of the invention, the grid is created with vertical and horizontal lines such that the image is divided into rectangular-shaped image cells while in other embodiments the grid may comprise curved lines, or lines that do not form a regular pattern. Other embodiments may include any combination of the above, or may include any other division of the image as may be desired to carry out the invention. The image may be divided into any number of image cells which may be of any size, shape, orientation, or other configuration.

In some embodiments of the invention, a group of image cells formed within a grid can be identified by a marker to distinguish the image cell relative to others within the entire electronic image. The marker may be a reference number according to a numbering convention. In an exemplary numbering system, the image cells may be designated with sequential numbers starting with zero (0) or one (1) in the upper left corner of the grid. The image cells may be assigned numbers from left to right (each column) and continue from top to bottom (each row). While any unique identifier or number may be assigned in any order, methods are provided herein whereby each image cell is assigned a unique number until all image cells are identified. Other numbering or marking systems may be used to designate the position of the image cells within the grid including but not limited to an alphabetical system (A-Z), an alphanumeric system (A1, A2 . . . Z10) or a color coded system may be used to uniquely label the plurality of image cells. In some embodiments of the invention, a simple binary-type cell identifier system can be also adopted. Each image cell would not have to be uniquely identified from every other image cell. For example, each image cell corresponding to a portion of a digital image may be designated either as a redacted cell or not (un-redacted cell). Any or all image cells designated as redacted cells can be altered while un-redacted cells remain visible in accordance with this embodiment the invention.

Figure 7:
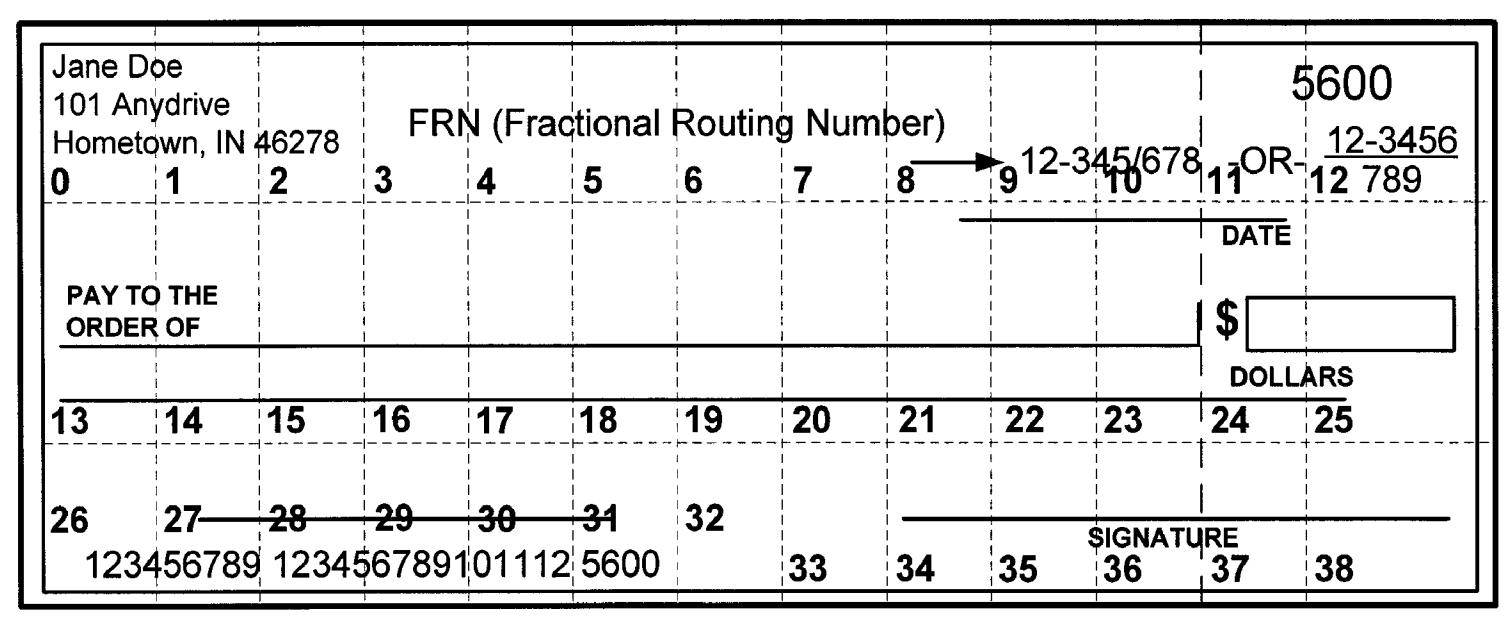

FIG. 7 illustrates a preferable embodiment of the invention whereby a plurality of image cells is identified using numerical cell identifiers ranging from zero (0) to thirty-eight (38). The cell identifiers begin with the number zero (0) in the upper left cell and may continue sequentially across the columns and in a row-by-row manner until all image cells are assigned a number ending with the number thirty-eight (38). Three rows of thirteen image cells are therefore created to provide a thirteen (13) by three (3) grid corresponding to portions of the digital image. In accordance with this aspect of the invention, the digital image may be redacted according to selected cell identifiers. This redaction may be accomplished by selecting a group of one or more cell identifiers corresponding to portions of the digital image containing sensitive information. The image fragments residing within these image cells can be redacted. Selecting cell identifiers for redaction may be accomplished by user input indicating which image cell identifiers, and thus their corresponding image cells, are to be redacted. A computer program may also include instructions or computer code to automatically select which image cell(s) are to be redacted based on corresponding image cell identifiers. Such computer code may further carry out steps to automatically redact a digital image according to selected cell identifiers. Accordingly, a first digital image can be altered by having at least one image cell redacted to provide a second digital image wherein the redacted image cell is illegible, thus securing personalized content.

Figure 8:
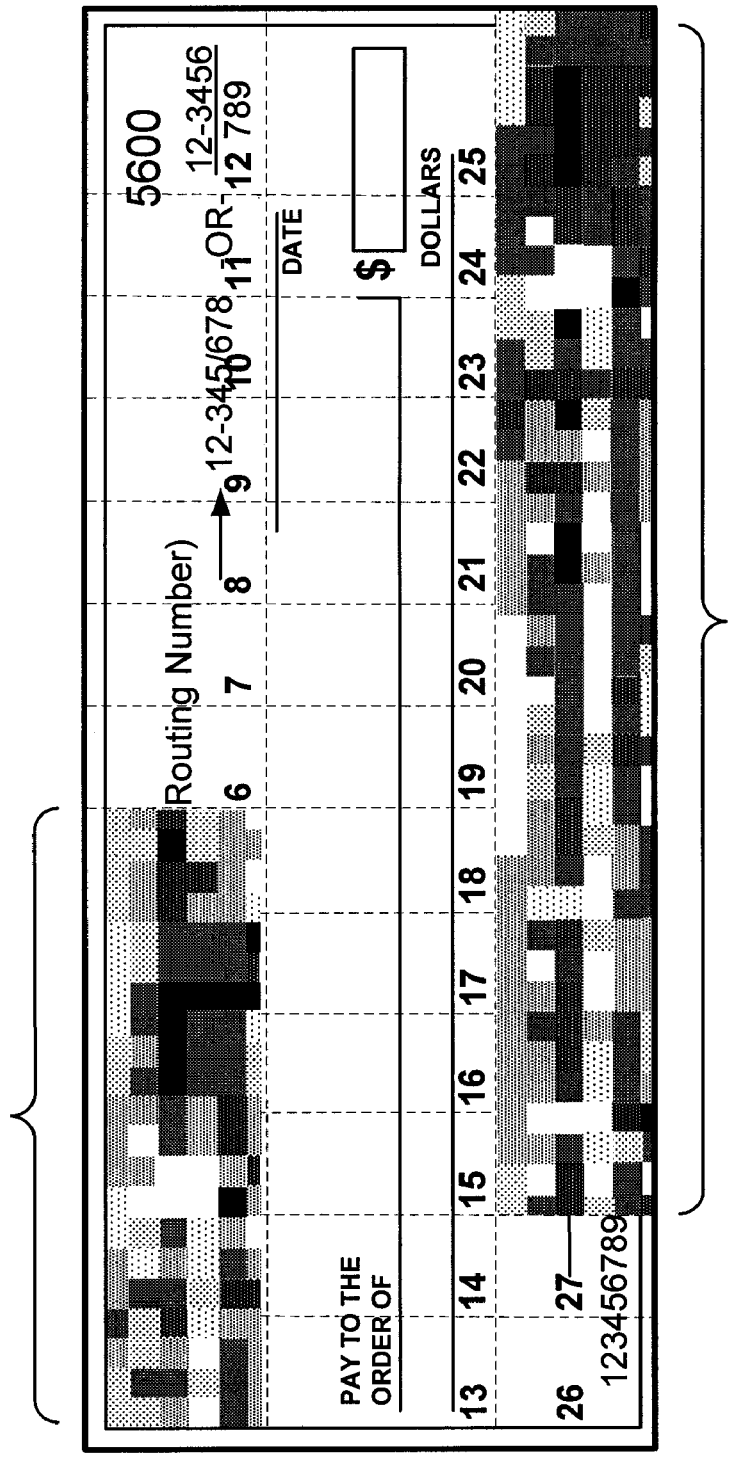

As shown in FIG. 8, a predefined group of image cells within the grid can be selected for redaction. Because the name and address of an individual often appears on the upper left hand corner of a check, image cells 1 through 5 can be selected for redaction as these cells correspond to that portion of the document or digital image. At the same time, since the routing transit and bank account numbers often appear along the bottom edge of a check, image cells 28 through 38 can be selected for redaction as these cells correspond to that portion of the check. Any number of image cells may be selected for redaction in order to partially or entirely secure information. For example, partial routing transit numbers may partially appear while the entire account number for a payor is completely illegible. In other instances it may be necessary or desired to reveal certain kinds of information appearing on the check such as the fractional routing number (FRN). So the image cells corresponding to this portion of the image (e.g., image cells 9 through 10) are not selected for redaction. Upon selection of the image cells that are to be redacted, a graphics editing tool or program can be used to redact those portions of the image in order to protect otherwise visible information. In this illustrated embodiment of the invention, the image cells chosen for redaction were masked or rendered illegible by pixelating the image cells or the portions of the digital image corresponding to the image selected cells. Other methods may be used to redact the image cells besides pixelating including but not limited to graying out, encrypting, blurring, masking, or drawing a line through all or just a portion of an image cell. In alternative embodiments, the redacted cells can be blurred or pixelated, wherein the blurring or pixelating is achieved by utilizing a blur size parameter to designate the size of the blurred area. A blur size may be, e.g., but not limited to, ten (10) by ten (10) pixels.

The selected image cells to be redacted can be identified according to markers or cell identifiers that direct the editing tool or program as to which portions of the digital image should be redacted. It shall be understood that information to be secured within checks or any other selected document in accordance with the invention may reside in slightly or entirely different locations therein. An appropriate number of image cells may be chosen in order to offer at least some minimal level of security to at least partially redact information positioned within a digital image since checks or any other selected document may vary in size and shape. Accordingly, a financial institution such as a bank may therefore decide beforehand how much or which portions of customer checks should be generally available for online display.

Figure 9:
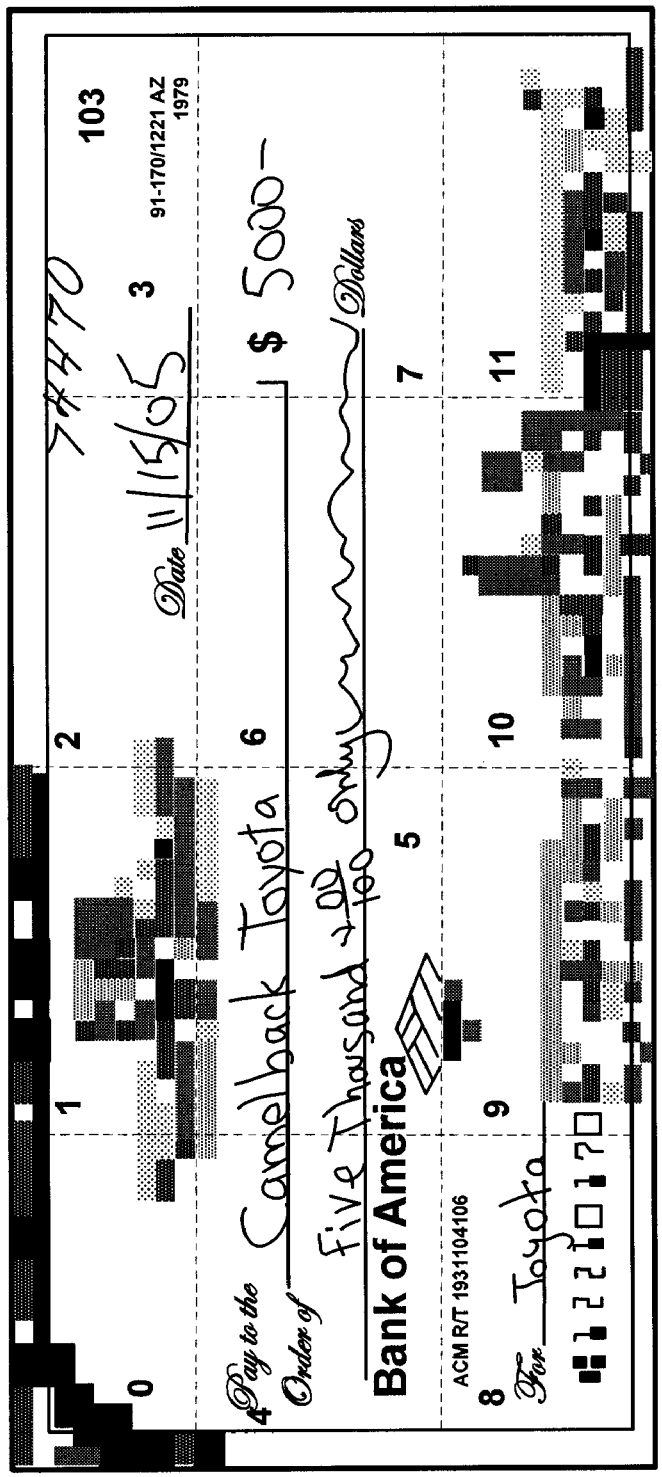
FIG. 9 illustrates a redacted digital image of a cashed personal check that is processed in accordance with another aspect of the invention.

FIG. 9 illustrates yet another embodiment of the invention that is applicable to personal checks. The personal check in this figure appears as it would to an ordinary observer on a display or monitor after it has been partially redacted in accordance with the invention. In this instance, a grid with three (3) rows by four (4) columns was selected that divides the digital image into twelve (12) image cells. After the check is cashed, the payor/account holder/customer may want to view the check on a home computer through an online banking system. Through a web browser, for example, the payor or any other person may select for viewing the cashed check (front/back images). Regardless of whether the image of the check has been intercepted or viewed by someone without permission, the relatively sensitive information contained thereon is secured in accordance with the invention. The digital image of the already scanned paper (hardcopy) document is redacted to conceal information such as the payor name and address, the routing transit and bank account numbers, plus the payor's signature which could otherwise be studied to commit forgery. Meanwhile, certain kinds of information can be visible to give some context and to convey some basic information that may be deemed useful but relatively non-sensitive or non-personal, e.g., date, name of payee, name of bank, dollar amount, purpose of check. In this illustration, image cells 0 through 1 and 9 through 11 were selected for redaction. The secured information has been redacted by pixelation and masked from view. The image cells could have been alternatively redacted by other masking techniques described elsewhere herein, or otherwise blackened or grayed out, partially or completely. As illustrated in this embodiment, selected image cells can be partially rather than entirely redacted. This degree of controlled redaction can be achieved based on the technique selected such as pixelation in this embodiment. It may be desirable to pixelate only certain portions of the image cells leaving other pixels corresponding to some image fragments within such cells intact and viewable. As with other embodiments of the invention, it may be thus desirable to only partially redact an image cell containing personalized information.

While masked or redacted images provided herein may be advantageous for securing personalized content, a user or customer may wish to view the original unredacted image or document. An alternative embodiment of the invention may offer this by presenting a complete digital image to an authorized person following an authentication procedure. A user may view an original unredacted image online after providing for example a user identification and password. It shall be understood that the invention may be also applied to digital image encryption/decryption schemes such as those disclosed in U.S. Pat. No. 6,954,532 (Handley et al), which is incorporated by reference in its entirety herein. But preferable embodiments of the invention herein can provide document security without encryption/decryption schemes or segmenting digital images into conceptual layers. For example, redacted portions of documents (e.g., pixelated) provided in accordance with the invention may be permanently altered and considered unredactable (e.g., unpixelated) by anyone including even the creator of the document. Other alternative embodiments of the invention however provide temporarily redacted documents that can be unredacted, preferably without public/private key encryption and decryption techniques wherein redacted images shared online include embedded public key information. Such keyless redaction and unredaction techniques such as pixelating/unpixelating according to graphical editing software programs (e.g., Adobe PhotoShop) that are known only by authorized users or viewers can be also be applied to embodiments of the invention herein. Alternatively, the unredacted image may be presented following some predetermined level of second level authentication online (or ordered through paper mail or made available and a local branch of a financial institution).

Figure 10:
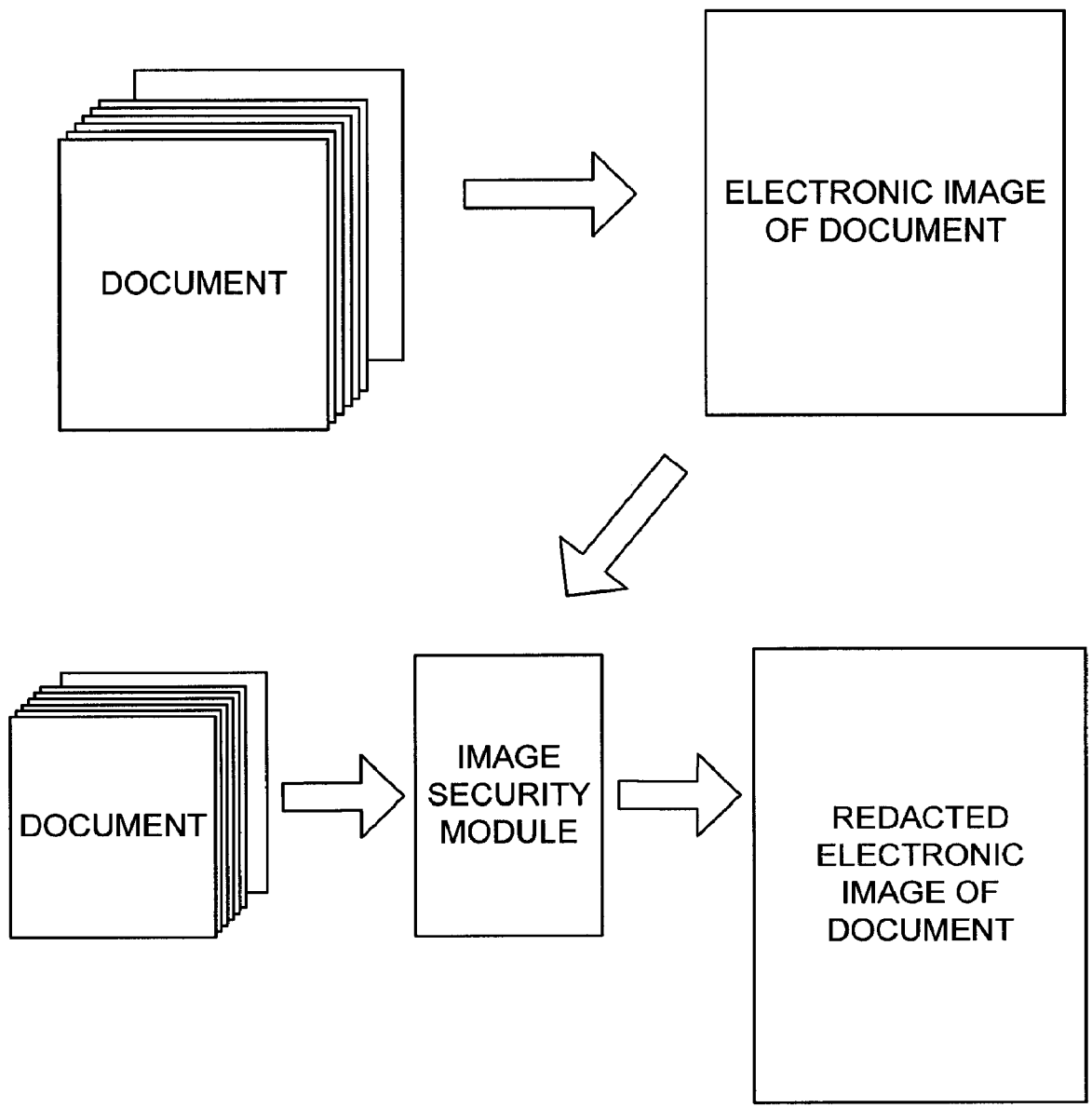
FIG. 10 describes a system for securing digital images from already digitally scanned documents or directly from paper documents with an image security module according to yet another aspect of the invention.

In accordance with yet another aspect of the invention, as shown in FIG. 10, one or more hardcopy paper documents can be modified to secure selected information contained therein. The digital image of an already scanned document can be redacted, or alternatively, paper documents can be scanned and converted directly into secured digital images. For example, an original unredacted group of one or more documents can be scanned to generate electronic images using image scanning tools or equipment. Such apparatus may have Optical Character Recognition (OCR) capabilities and be able to scan paper copies to generate unredacted digital images according to a preselected digital image format such as a JPEG format, for example. The image(s) may be subsequently redacted and converted by upon execution of a computer software program for redacting digital images that resides in the memory of a computer provided in accordance with another aspect of the invention described herein. A computer running the software program (redactor) may contain an image security module that redacts selected portions of the already scanned digital images to secure certain information as described elsewhere herein. The image security module may optionally convert the first unredacted digital image existing in a first format (JPEG) into a second redacted digital image existing in a second format (PDF). It shall be understood that the redactor and/or image security module may operate independently as a stand alone application software program or an add-on tool for commercially available image scanning and conversion programs.

FIG. 10 illustrates another embodiment of the invention whereby paper documents are directly scanned and secured by the image security module. It shall be understood that the image security module may be a computer program or set of instructions to carry out a method of redacting digital images of hardcopy documents, or it may be a discrete set of instructions or a combination of subroutines to perform functions such as the scanning and/or redacting of documents as described herein. For example, a group of one or more selected paper hardcopy documents can be processed by the image security module to redact certain portions thereof. When the documents are relatively uniform in appearance, e.g., shape, size, font, a common group of image cells corresponding to similar portions of the documents can be scanned and redacted in accordance with other aspects of the invention described elsewhere herein. However when the documents to be scanned and redacted are not uniform, or if different regions of similar or uniform documents are to be redacted, then the image security module can selectively redact digital images accordingly such that resulting digital images of the documents protect information residing at different portions of the scanned documents. Either the redacted digital images of the paper documents can be rendered for immediate display, or they can be stored for later viewing after being processed by the image security module to mask or hide sensitive information appearing on the face of the documents. Accordingly, paper documents can be scanned and directly converted into redacted digital images by the image security module.

Various aspects of the invention herein may scan paper documents, or convert digital images of documents, into any digital image format. The following is a description of some of the most commonly used graphics file formats for putting graphics on the World Wide Web that may be applied to the invention:

JPEG/JPG. Short for Joint Photographic Experts Group, the original name of the committee that wrote the standard. JPG is an image file format supported on the Web that is a lossy compression technique designed to compress color and grayscale continuous-tone images. The information that is discarded in the compression is information that the human eye cannot detect. JPG images can support 16 million colors and are suitable for photographs and complex graphics. A user may have to compromise on either the quality of the image or the size of the file. JPG may not work well on line drawings, lettering or simple graphics.

GIF. Short for Graphics Interchange Format, another of the graphics formats supported by the Web. Unlike JPG, the GIF format is a lossless compression technique and it can support 256 colors. GIF may be viewed as a preferred format over JPG for images with only a few distinct colors, such as line drawings, black and white images and small text that is only a few pixels high. With an animation editor, GIF images can be put together for animated images. GIF also supports transparency, where the background color can be set to transparent in order to let the color on the underlying Web page to show through.

PNG. Short for Portable Network Graphics, it is another graphics standard found on the Web but is not supported by all browsers. An image in a lossless PNG file can be 5%-25% more compressed than a GIF file of the same image. PNG builds on the idea of transparency in GIF images and allows the control of the degree of transparency, known as opacity. PNG does not support animation like GIF does.

It shall be understood that the invention herein can redact and convert or produce document images from many other different types of image formats such as TIF, TIFF, BMP, PSD, WMF, EMF, PCX, PIC and PDF formats.

Another aspect of the invention provides automated high throughput processes wherein a large number of digital images can be generated and/or secured on-the-fly (real time). For example, many checks from various financial institutions often adopt a relatively standard or substantially similar format. Because checks usually include the same kinds of information, their corresponding images can be similarly redacted (batch redacted) without individual manual editing or redacting with software programs such as Adobe PhotoShop. A variety of automated processes and systems are provided herein to redact sensitive information from digital images of documents for display online or through other communication channels as part of a high throughput process. With respect to checks, the image masking systems and processes herein can leverage the fact that personal or sensitive information often appears in common locations as described elsewhere herein. The front side of a check, for example, may include the payor address in an upper left side area while the routing number and account number may appear along the bottom near the signature of the payor. Digital images of a plurality of checks, for example, can be secured or altered in an automated batch process, thus requiring less time than would be required if the images were scanned and/or secured individually. A grid constructed with a plurality of image cells can be designed for the checks as described herein so that commonly selected (or the same) image cells can be redacted on-the-fly for each corresponding check. The selection of a sufficient number and/or location of image cells for redaction may be considered in view of modest variations existing as between different checks (different sizes, fonts and layouts). Some information on checks may be more edited or redacted compared to others but enough cells should be appropriately selected for redaction in order to sufficiently mask the check images to afford at least some level of protection, e.g., at least 5 digits from a 9 digit routing transit number should be redacted while 6, 7 or more digits may be redacted in some checks. The digital images of the checks or any other document containing information to be protected herein can be therefore dynamically divided and masked in accordance with the invention on-the-fly, and preferably as part of a batch processing of checks or other documents by a financial institution, merchants and other parties desiring secure digital images.

For example, referring to FIG. 10, an image security module may perform a batch security process to securely display cashed checks for viewing by banking customers. In a preferable embodiment of the invention, the hardcopy paper versions of the checks (presumably cashed and held by a bank) can be digitally scanned using high volume paper scanners to capture and create digital images of (both front and back sides) the checks. A series of one or more image files such as PDF files can be created containing electronic images of the checks in unredacted form. This image data can be thereafter processed by an image security module to create redacted electronic images of the checks for secure viewing in accordance with other aspects of the invention described elsewhere herein. The image masking systems and methods herein can perform a wrapper function around existing image content by taking an already scanned document and blurring or redacting relevant parts of the digital image before presenting it to an end user. Alternatively, the digital image information corresponding to the checks upon scanning can be fed directly into the image security module whereby the function of redacting selected portions of the digital images are performed without generating unredacted digital versions of the checks. For some applications, it may be more useful to only create and/or store redacted electronic images of checks. No duplicate images are generated at all which reveal sensitive information according to this embodiment of the invention. Accordingly, this aspect of the invention allows a plurality of checks or any other documents with similarly located information to be redacted more efficiently and faster in time than if the digital images were redacted individually.

Other embodiments relating to this aspect of the invention can provide batch processing of digital images for other kinds of documents containing confidential or sensitive information described elsewhere herein to protect against identity theft, fraud and other kinds of illegal activity.

In an online application of the invention that securely displays digital images, the following data flow can be implemented: a user requests a page with a dynamic image content (such as a check); a server returns a HTML page with a reference to a back end service that can provide the image; a browser intercepts the <IMG> tag and follows the SRC link to retrieve the image; the service behind the <IMG> link interprets the request and locates the image in a repository (e.g., scanned documents created as shown in FIG. 10); and an image stream can be buffered and streamed back to the client browser. Accordingly, a straightforward and simple integration of the invention can be accomplished with an existing process whereby a server retrieves or receives an already scanned digital image, which is passed through an image security module, e.g., including ImageMask module, before sending the redacted (masked) image to a client (customer browser).

A preferable embodiment of the invention performs a wrapper function around an existing image content call, for example, when a customer desires to view a cashed check. This Java API function call can take the image and mask relevant parts in accordance with the invention herein before resolving an updated redacted image to an end user. The typical delivery process and image can retain intact, processing time can be negligible and no duplicate images are generated.

Figure 11:
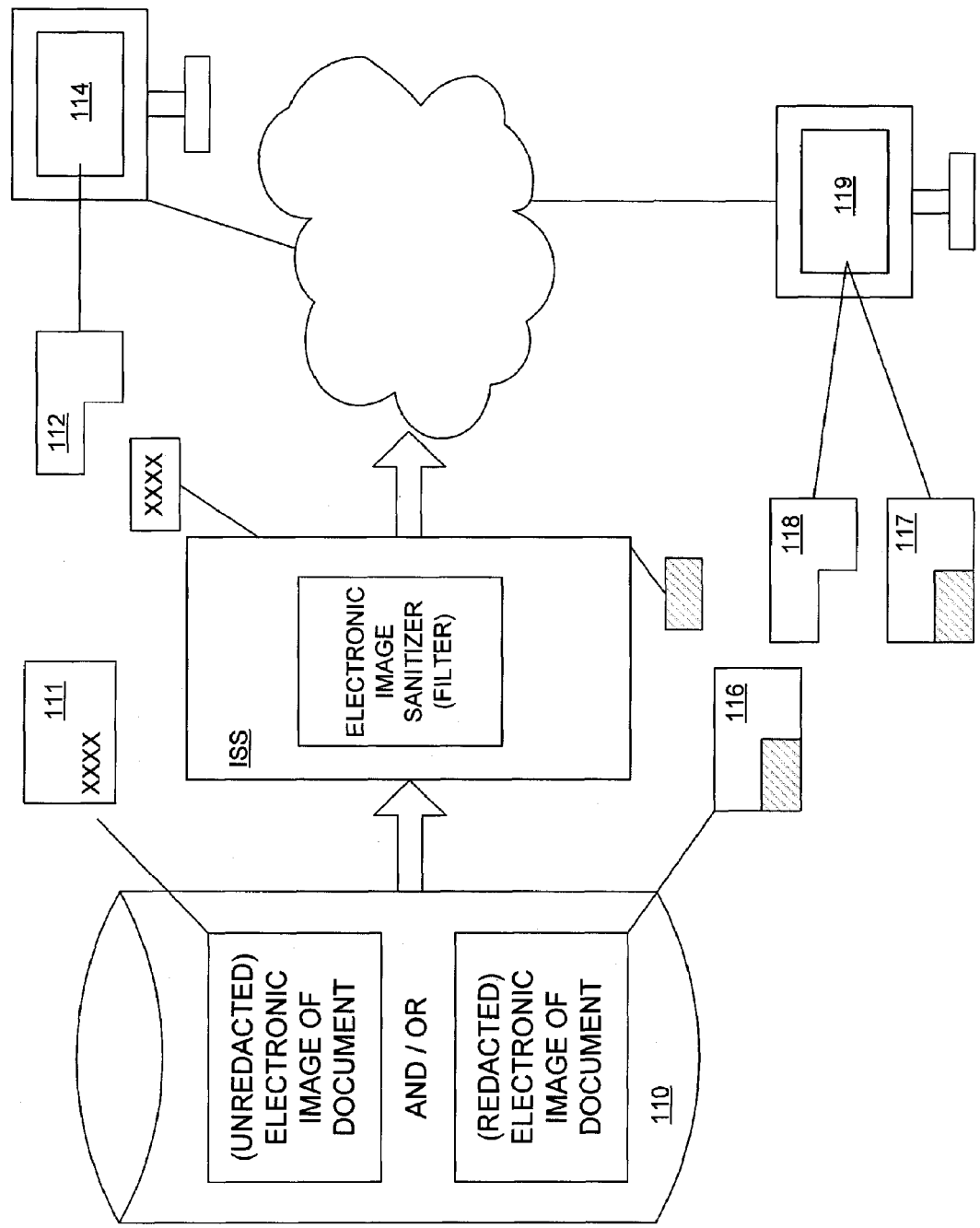
FIG. 11 describes a system for securing digital images with an electronic image sanitizer that can filter out and send only sections of an electronic image for secure viewing.

In accordance with another aspect of the invention, a database or repository of digital images can be created as shown in FIG. 11. It shall be understood that the repository may be maintained and integrated as part of an overall banking system or other network providing secured display of sensitive documents. The plurality of digital images may include both redacted and unredacted electronic images of documents. Such documents include bank checks, statements and any other documents containing sensitive information including those described elsewhere herein. The documents in the repository may be processed by an image security system (ISS) before their images are transmitted or streamed to viewers across a network like the Internet for viewing on a computer or device browser. The image security system may include one or more servers and computers containing computer programs for securing digital or electronic images of documents in accordance with other aspects of the invention. A server may retrieve a digital image from a repository, which is then passed through the image security system, before sending the redacted image to a client (customer browser). In addition to or instead of containing an image security module (see FIG. 10) and other programs, a computer memory in the image security system may also include an electronic image sanitizer. The electronic image sanitizer may be a software program or module with computer implemented instructions or code that filters out selected portions of an image before transmission for viewing. The selected portions of the image may be created and divided into multiple image cells as described elsewhere herein.

For example, the electronic image data for a document such as a cashed personal check may be stored in the repository 110. When the document exists in its unredacted form, its image may be divided into a plurality of image cells so that certain selected cells containing sensitive information can be identified in accordance with other aspects of the invention (e.g., FIG. 9). The image data corresponding to the selected cells can be filtered out by the electronic image sanitizer. The filtered data can be discarded or optionally retained (XXXX) by the security system. So only some and not all image cells of the document are transmitted for secured viewing. The image data and related pixel information corresponding to areas of the document containing sensitive information can be thus omitted from transmission. A sanitized document 112 can therefore be made available for viewing on a computer browser 114 that visibly excludes sensitive information.

Alternatively, a document may exist in the repository in its redacted form 116 following image data processing in accordance with other aspects of the invention. In this embodiment of the invention, the document may have been already redacted by the image security module so that sensitive portions of the document are not legible when rendered on a computer browser or device screen 119. Here the image security system may transmit directly or indirectly a complete set of image data for a document 117 including both redacted and unredacted portions. The transmitted image data may include information corresponding to redacted image cells (solid masked and/or pixelated image portions) and unredacted image cells. But in alternative embodiments of the invention, the data for some image cells (cross-hatch/shaded section), preferably the ones corresponding to confidential or sensitive information in a document, are not transmitted at all and omitted from the relayed image data to render a sanitized document 118 for viewing on a display. This may reduce the amount of data sent over the networks to a remote user device, and also provides added security in that the data corresponding to sensitive information does not even leave a secure computer network such as those operated by financial institutions. Selected image data or data streams corresponding to repository documents can be buffered and streamed back to a client browser or display for secure viewing. Accordingly, this aspect of the invention provides systems and processes for sanitizing a digital representation of a document for viewing.

The embodiments of the invention which perform sanitization of documents and data herein may be characterized as systems and processes for removing sensitive information from a document or other medium so that it may be securely distributed. When dealing with sensitive or classified information, sanitization may convert an otherwise classified document into an unclassified document. For example, a page of a classified document may be sanitized for public release in accordance with the invention. Classified information may be removed so that only the unclassified information is available or visible. A printed document which contains classified or sensitive information will frequently contain significant information which is less sensitive. And, there may be a need to release the less sensitive portions to uncleared personnel or members of the general public such as requests under the Freedom of Information Act (FOIA). The printed document may thus be sanitized to remove the sensitive information, or as with any of the embodiments of the invention herein, the document may be redacted to obscure the information instead. The terms sanitization and redaction as used herein may be applied to printed or paper documents as well as computer media, information and data as well.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for securely transmitting a digital image containing sensitive information, the method comprising:
   - selecting a digital image with sensitive information for processing by an image security system;
   - dividing the selected digital image into a plurality of image cells according to a predetermined cell division pattern that is selected based on a type of document selected from at least one of the following: a check, a deposit slip, a bank statement, a credit card bill, a tax return, a driver's license, and a medical record;
   - assigning each of the plurality of image cells with a cell identifier;
   - automatically selecting from the plurality of image cells at least one image cell for redaction based on its position within the predetermined cell division pattern and the type of document selected from at least one of the following: a check, a deposit slip, a bank statement, a credit card bill, a tax return, a driver's license, and a medical record;
   - instructing the image security system to automatically redact the selected position-based at least one image cell from the plurality of image cells, thereby generating a redacted digital image without generating an unredacted version;
   - transmitting the redacted digital image, wherein no images are generated which reveal redacted information; and
   - generating a new digital image for display on a device following the transmitting step which is missing the redacted information.

2. The method of claim 1, wherein more than one digital image can be selected and redacted at the same time in a high throughput automated process.

3. The method of claim 1, wherein dividing the selected digital image into a plurality of image cells can be performed by dividing the selected digital image into a grid of image cells comprising at least one row and at least one column.

4. A non-transitory computer readable medium containing program instructions for automatically securing a digital image which contains sensitive information, comprising:
   - program instructions for selecting a digital image with sensitive information to be securely shown as a displayed image on a display for processing by an image security system;
   - program instructions for dividing the selected digital image into a plurality of image cells according to a predetermined cell division pattern that is selected based on a type of document selected from at least one of the following: a check, a deposit slip, a bank statement, a credit card bill, a tax return, a driver's license, and a medical record;
   - program instructions for assigning each of the plurality of image cells with a cell identifier;
   - program instructions for automatically selecting from the plurality of image cells a set of image cells for redaction based on its position within the predetermined cell division pattern and the type of document selected from at least one of the following: a check, a deposit slip, a bank statement, a credit card bill, a tax return, a driver's license, and a medical record;
   - program instructions for instructing the image security system to automatically redact the selected set of positioned-based image cells from the plurality of image cells, thereby generating a redacted digital image for secure viewing of the redacted digital image;
   - program instructions for transmitting the redacted digital image, thereby rendering only the redacted digital image for display; and
   - program instructions for generating a new digital image for display on a device following the transmitting step which is missing the redacted information.

5. The non-transitory computer readable medium of claim 4, wherein the computer readable medium selects and transmits more than one digital image at the same time.

6. The non-transitory computer readable medium of claim 4, wherein the computer readable medium divides the selected digital image into a plurality of image cells based on one of a plurality of division patterns, the division patterns including:
   - dividing the selected digital image into a grid of image cells comprising at least one row and at least one column.

7. A method for securely transmitting a digital image containing sensitive information, the method comprising:
   - selecting a digital image with sensitive information for processing by an image security system;
   - dividing the selected digital image into a plurality of image cells according to a predetermined cell division pattern that is selected based on a type of document selected from at least one of the following: a check, a deposit slip, a bank statement, a credit card bill, a tax return, a driver's license, and a medical record;
   - assigning each of the plurality of image cells with a cell identifier;
   - automatically selecting from the plurality of image cells at least one image cell for redaction based on its position within the predetermined cell division pattern and the type of document selected from at least one of the following: a check, a deposit slip, a bank statement, a credit card bill, a tax return, a driver's license, and a medical record;
   - instructing the image security system to automatically and permanently redact the selected at least one position-based image cell from the plurality of image cells to form an unredactable displayed digital image;
   - transmitting a complete set of image data corresponding to the digital image, thereby permanently redacting the sensitive information; and
   - generating a new digital image for display on a device following the transmitting step which is missing the redacted information.

* * * * *